Figure 1:
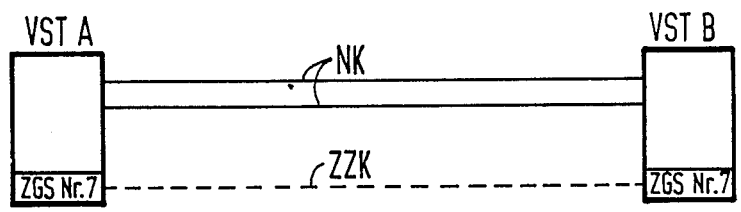

United States Patent [19]

Beckh

[11] Patent Number: 4,962,525
[45] Date of Patent: Oct. 9, 1990

[54] METHOD FOR THE USE OF A TELEPHONE SYSTEM WITH COMMON SIGNALING CHANNEL FOR THE CASTING OF VOTES

[75] Inventor: Horst Beckh, Munich, Fed. Rep. of Germany

[73] Assignee: Siemens Aktiengesellschaft, Berlin and Munich, Fed. Rep. of Germany

[21] Appl. No.: 343,454

[22] Filed: Apr. 25, 1989

[30] Foreign Application Priority Data

Apr. 26, 1988 [DE] Fed. Rep. of Germany ....... 3814064

[51] Int. Cl.$^5$ ...................... H04M 11/00; H04M 1/64
[52] U.S. Cl. .................... 379/92; 379/139; 379/207; 379/230
[58] Field of Search ............... 379/92, 113, 134, 133, 379/139, 207, 230

[56] References Cited

U.S. PATENT DOCUMENTS

| | | | |
|---|---|---|---|
| 3,909,536 | 9/1975 | Watson et al. | 379/92 |
| 3,950,618 | 4/1976 | Bloisi | 379/92 |
| 4,151,370 | 4/1979 | Root | 379/92 |
| 4,788,716 | 11/1988 | Zebe | 379/92 |

OTHER PUBLICATIONS

C. J. Simon, "Common channel Interoffice Signaling (CCIS)", *GTE Automatic Electric Journal*, Mar. 1979, pp. 50-58.

Primary Examiner—Jin F. Ng
Assistant Examiner—Wing F. Chan
Attorney, Agent, or Firm—Jeffrey P. Morris

[57] ABSTRACT

Casting of votes takes place by the dialing of a subscriber number of a stated destination switching center. By omitting establishing a connection to the destination switching center in the source switching center only the appropriate connection requests are summed and, after a predetermined sum value has been reached or after a given length of time has passed since the beginning of the vote taking, the particular sum value is signaled to the destination switching center via the common signal channel.

3 Claims, 2 Drawing Sheets

METHOD FOR THE USE OF A TELEPHONE SYSTEM WITH COMMON SIGNALING CHANNEL FOR THE CASTING OF VOTES

The present invention relates to a method for the use of telephone systems with a common signaling channel for the delivery of votes by dialing the subscriber number of a destination switching center corresponding to the particular votes.

Telephone systems have previously already been used for the delivery and determination of votes in such manner that subscriber numbers of a destination switching center, which for example have been announced by radio or television, could be dialed for casting votes. In the process the appropriate connections to the destination switching center were established and there numerically determined over a given period of time.

In this type of poll the votes were cast as a rule during a relatively short time period through a multiplicity of voting participants simultaneously, with the result of an enormous sudden load on the telephone network in the individual connection directions toward the destination switching center.

It has therefore already been suggested to permit at the individual source switching centers in each instance only one given fraction of the voting calls establishing a connection. But even then a considerable network load must be expected.

The task of the invention, accordingly, consists in improving a method of the above stated type in that way that casting votes is possible at yet lower load of the telephone system.

According to the invention the task is solved in that by omitting the setup of telephone connections in the source switching centers only after input of the numerical information, the connection requests recognized to be votes are added, and that thereupon via the common signaling channel the resulting sums are signalized to the destination switching center and there added.

Due to the method according to the invention thus the speech path network of the telephone system is not subjected to load at all. The additional load of the common signaling channel can readily be accepted. An additional advantage of this method is that incoming voting calls can be accepted to a far greater extent than in the conventional case of connection to the destination switching center as described above.

According to a further design of the invention signaling the sum signals takes place when a predetermined threshold value has been reached in the individual source switching centers. An alternative to this consists in that signaling takes place when a given time interval has passed after the beginning of vote taking.

Figure 2:
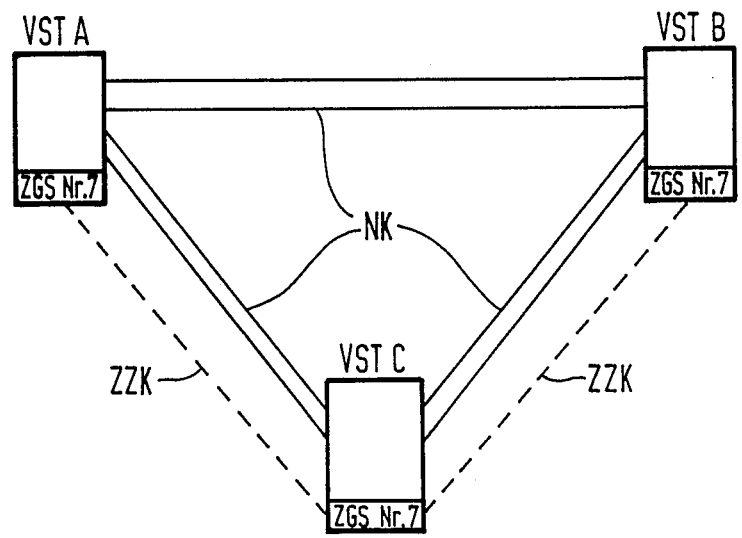
Figure 3:
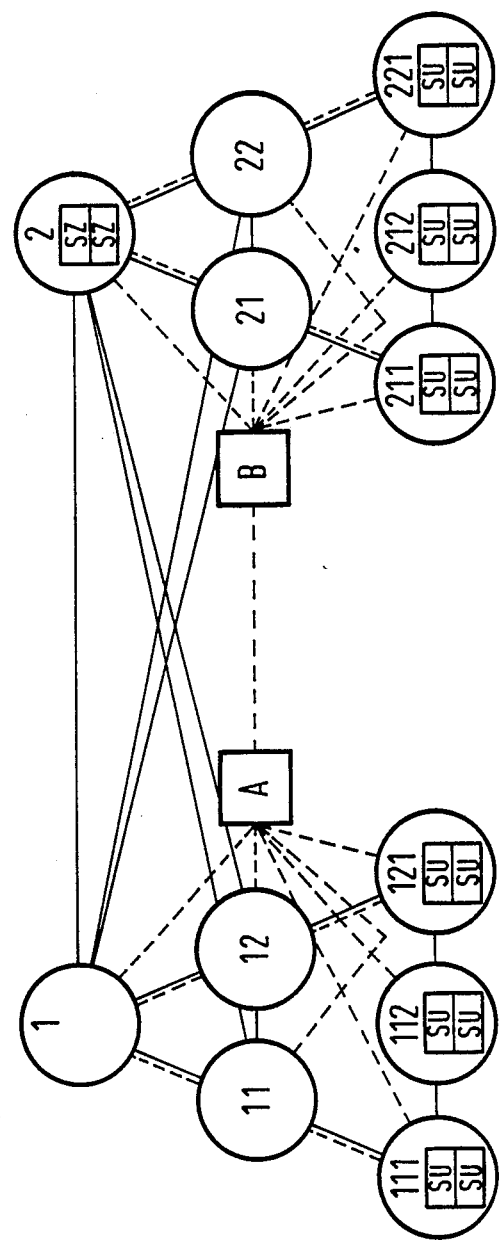

Below the method according to the invention will be explained in greater detail in conjunction with an embodiment example with reference to a drawing in which:

FIGS. 1 and 2 are block diagrams showing two network subconfigurations for elucidating the principle of the common channel signaling system; and FIG. 3 is a diagram illustrating a network configuration of a telephone system with several switching centers which, in connection with vote casting, are source switching centers and destination switching centers.

In a communication network for the purpose of exchanging messages as a rule two subscriber end devices are connected with each other via several line segments and switching equipment. In particular in connection with the connection setup it is required to supply the switching centers which must be passed through consecutively with control information which ensures the through-switching of connections to the desired subscriber device. The flow of information for the control of the connection establishment is referred to as signaling. Three different types of signaling are differentiated, specifically those which take place between subscriber and his local switching center (for example the transmission of the dial information), signaling within a switching center, and signaling between the switching centers. In connection with the last cited signaling between switching centers up to now the exchange of signals takes place predominantly on the particular voice circuit which is why this is referred to as voice circuit-bound signaling.

In contrast hereto is the so-called common channel signaling in which signaling for many voice circuits is completed via a signaling channel used in common. According to a definition of the common channel signaling system No. 7 pertaining hereto signaling from approximately 2500 interexchange trunks can be completed via a common signaling channel.

Since numerous trunk groups between the switching centers comprise far less than 2500 voice circuits, it is not economical to establish parallel to each group a signaling channel in the form of a separate line. Instead of such signaling, also referred to as associated mode of operation (see FIG. 1), the cited signaling system provides therefore to carry the signals for a trunk group between two switching sites VSTA and VSTB via a third switching site VSTC whereby the load of the common signaling channels between the switching centers VSTA and VSTC or between the switching centers VSTB and VSTC is better distributed. This case is referred to as a quasi-associated mode of operation (see FIG. 2). This is also then possible if a common signaling channel between two switching centers is interrupted.

In FIG. 3 as example a hierarchically structured telephone network with three network planes, a distinct code path, and an intermeshing through ascending as well as also descending transverse paths is represented. The voice paths of this network are indicated as solid connections of the circles representing the individual switching centers.

It is further a signaling network with mixed mode of operation assumed, i.e. working channels as well as signaling channels extending between individual switching centers are present, for example between switching centers 111, 11, and 1, as well as such signaling channels are provided which do not extend parallel to a voice path, or individual switching centers in terms of signaling are only connected by way of a bypass via a further switching center. Thus, for example, the switching centers 111 and 112 are connected in terms of signaling via switching center 11.

FIG. 3 shows with A and B two so-called signaling transfer points which are connected with each other by a signaling path, i.e. points at which user messages are neither generated nor processed but only conducted, apart from the messages of the signaling network management for which a signaling transfer point can be both source as well as also sink. These signaling transfer points are here represented as independent units, but they could also be component parts of a switching center.

In the end switching centers, which represent the source switching centers within the meaning of the method according to the invention in question, cum counters SU are indicated. In the switching center 2, which in the represented example is the destination switching center in connection with a vote casting according to the invention, sum counters SZ are additionally indicated.

If now, by dialing given subscriber numbers of the destination switching center 2, by the subscriber end sets connected to the switching centers 111 to 121 and 211 to 222, votes are cast, then in the individual source switching centers after the numerical information has been received, only the sum counter SU is connected through. Without that, the setup of a voice path connection to the destination switching center would conventionally be initiated. The voting caller receives a tone or an announcement by which the fact that his vote is being taken is signaled to him. The technique of answering the voting caller, adding the vote to the sum counter, and disconnecting the caller line is well known and is similar to the conventional arrangement for taking votes at the destination switching center.

Either when the individual sum counters SU have reached a given counter level or when, since the beginning of the vote taking, a given length of time has passed, the levels of these counters are signaled via the particular common signaling channels from each of the source switching centers to the destination switching center, where appropriate setting of the sum counters SZ there takes place whose final counter level then represents the voting result. The voice path network is, as desired, not subjected to load in the process.

What I claim:

1. A method for the use of a telephone switching system with a common signalling channel for the casting of votes from callers by dialing a particular vote subscriber number of a destination switching center corresponding to a particular vote, comprising the steps of:

providing a common signalling channel between a plurality of source switching centers and the destination switching center;

answering and counting votes cast by callers at each of said plurality of source switching centers for incoming calls which correspond to the particular vote subscriber number dialed, and inhibiting the connection of the incoming calls to the destination switching center;

summing the vote count of each of said plurality of source switching centers and periodically transferring a sum value of the vote count to the destination switching center using the common signalling channel; and adding the sum values from the source switching centers at the destination switching center.

2. The method as stated in claim 1, wherein said step of periodically transferring a sum value takes place each time a predetermined threshold value is reached.

3. The method as stated in claim 1, wherein said step of periodically transferring a sum value takes place each time a given time interval has passed after the beginning of the vote taking.

* * * * *